March 10, 1970

T. E. SLUGANTZ 3,499,230

DRYER CONTROL

Filed July 23, 1968

United States Patent Office 3,499,230
Patented Mar. 10, 1970

3,499,230
DRYER CONTROL
Thomas E. Slugantz, Versailles, Ky., assignor to Texas Instruments Incorporated, Dallas, Tex., a corporation of Delaware
Filed July 23, 1968, Ser. No. 746,873
Int. Cl. F26b *21/06*
U.S. Cl. 34—45                                              8 Claims

ABSTRACT OF THE DISCLOSURE

An electronic dryness control for a home laundry dryer is described. The control is of the type which employs the resistance of a current path extending through the load to be dried as an indication of the dryness or moisture content of the load. When a preselected level of dryness is reached a motor driven timer is energized to control the remainder or terminal portion of the cycle. The timer motor is energized through a serially connected PTC thermistor which is self-heated to a high level of resistance while the sensing path resistance is low. This high level of thermistor resistance thus prevents operation of the timer during the time that the load is still damp and the thermal inertia of the thermistor prevents energization of the timer motor by transient variations in the resistance of the path.

---

This invention relates to a dryer control and more particularly to such a control which senses the moisture content of a load to be dried by means of the resistance of a current path through the load.

Electronic dryness sensing controls for home clothes dryers of the type described above have been manufactured heretofore. However, such controls have typically required the inclusion of a capacitor of relatively large value to filter or integrate the signal obtained from the sensing path thereby to prevent the drying cycle from being terminated prematurely by transient variations in the resistance of the path. The capacitors represent a substantial portion of the cost of the control because the extremely high values of resistance encountered require that very low leakage capacitors be used. Furthermore, such prior art controls usually provided an essentially immediate termination of the drying cycle when a predetermined final dryness level was reached. This then required that the dryness control be responsive to changes in resistance at the extremely high values of resistance which correspond to the almost complete elimination of moisture from the load.

It has also been proposed to employ heaters of various types and to employ the thermal inertia of the heater to provide the requisite filtering. However, such controls proposed thus far have been relatively complex or have employed relatively troublesome mechanical switching elements. Further, certain of these controls applied substantial amounts of pulsating D.C. to timer motors employed therein which is disadvantageous in the case of motors having permanent magnet fields.

Among the several objects of the present invention may be noted the provision of a control for a dryer which will terminate a drying cycle after a predetermined level of dryness is attained; the provision of such a control which employs the resistance of a curent path through a load to be dryed as an indication of the dryness of the load; the provision of such a control which will not prematurely terminate a drying cycle due to transient variations in the resistance of the sensing path; the provision of such a control which does not require the use of expensive capacitors; the provision of such a control in which the sensing of extremely high resistance levels is not required; the provision of such a control which employs a motor driven timer and which does apply substantial amounts of pulsating D.C. to the timer motor; and the provision of such a control which is highly reliable and which is relatively simple and inexpensive. Other objects and features will be in part apparent and in part pointed out hereinafter.

Briefly, a control according to this invention is operative with a dryer having means for agitating a load to be dried and electrode means for contacting the load to establish a current path therethrough, the resistance of the path being variable as a function of the moisture content of the load. The control includes switching means for controlling the energization of the agitating means and the switching means includes a motor driven timer for providing a terminal period of operation of the dryer at the end of which the agitating means is de-energized. The timer motor is selectively energized through circuit means which includes a PTC thermistor connected in series with the motor across a source of electric power. Means are provided for energizing the thermistor at a high level relative to the level of energization of the motor while the resistance of the sensing path is below a preselected threshold. This high level of energization causes the thermistor to self-heat to a relatively high value of resistance, the current which will flow from the source through the high value of resistance being insufficient to operate the timer motor. Accordingly, the timer motor is prevented from running by the high resistance of the thermistor while the load is relatively damp and is permitted to run when the load reaches a preselected level of dryness thereby providing a timed terminal period of operation of said dryer. The thermal inertia of the thermistor prevents transitory energization of the motor in response to transient variations in the resistance of the path during the operation of the dryer before said load reaches the preselected dryness level.

The invention accordingly comprises the constructions hereinafter described, the scope of the invention being indicated in the following claims.

The accompanying drawing, which illustrates one of various possible embodiments of the invention, is a schematic circuit diagram of a dryer employing a control according to the present invention.

Referring now to the drawing, A.C. power for energizing the dryer is provided through three supply leads L1, L2 and L3. Preferably leads L1 and L2 are of opposite phase with respect to lead L3 which is a neutral or ground lead in conventional manner. Leads L1 and L2 may, for example, each provide 110 v. A.C. with respect to lead L3, there being 220 v. A.C. between leads L1 and L2. The physical construction of the dryer may be conventional and is therefore not illustrated in detail herein. The dryer includes a motor as indicated at M1 for agitating the load to be dried, as by rotating a drum within which the load is contained, and for driving a blower which ventilates the load to carry off moisture evaporated therefrom. A heater H1 is provided to heat the load or the air which is being blown through the load thereby to accelerate the evaporation of moisture. The dryer further includes a pair of electrodes, indicated diagrammatically at 11 and 13, which are adapted to contact a load being dried thereby to establish a current path therethrough, the resistance of the path being variable as a function of the moisture content of the load as is known in the art. Various suitable dryer drum and electrode constructions are shown in Patent 3,266,167 issued Aug. 16, 1966, to F. Finnegan.

Motor M1 is selectively energized from leads L2 and L3 through a circuit which includes a set of timer contacts K1 which are a part of a timer T. A supply lead L4 is connected between motor M1 and contacts K1 so as to be energized simultaneously with the motor. Heater H1 is selectively energized from leads L1 and L2 through a circuit which includes a set of timer contacts K2. Contacts K1 and K2 are operated by respective cam followers 15 and 17 which bear against and are controlled by respective cams 19 and 21. Cams 19 and 21 are coupled to and driven by a geared-down timer or clock motor M2 through an over-ride or slip clutch indicated at 22. A knob 23 is mounted on the shaft with cams 19 and 21 so that the cams 19 and 21 may be manually rotated by means of the knob 23 independently of rotation of the motor M2.

The cams 19 and 21 include respective lobes 29 and 31 so that, when the cams are in the positions shown in the drawing, the respective contacts K1 and K2 are operated to their open positions. Timer T thus constitutes switching means for controlling the energization of the dryer including the agitating means, the motor M1.

The timer motor M2 is selectively energized from leads L3 and L4 through a circuit including a thermistor TH connected in series with the motor across this power source. Thermistor TH is of the PTC type, that is, it has a positive temperature coefficient of resistivity. Further, thermistor TH is preferably constructed of a material having a transition temperature above which the resistivity of the material rises relatively abruptly. Such materials are known in the art for use as self-regulating heating means since the abruptly increasing resistance characteristic reduces the device's power consumption at the transition temperature thereby maintaining its temperature at that level. The size and nominal resistance of thermistor TH are chosen such that, when the thermistor is cool, sufficient current will flow therethrough from the source to operate the timer motor M2 without appreciable self-heating of the thermistor.

The timer motor M2 is shunted by the anode-cathode circuit of an SCR (silicon controlled rectifier) Q1. When the SCR conducts, the energization of the thermistor is substantially increased while the energization of the motor is decreased. When the thermistor is thus energized at a high level relative to the level of energization of motor M2, appreciable self-heating occurs in the thermistor and its temperature rises to a level providing a high value of resistance. The current which can flow from the source through this high value of resistance is insufficient to operate the timer motor M2. Other triggerable semiconductor current switching devices, such as triacs, may also be used in place of the SCR Q1.

The electrode 11, which may for example comprise the dryer drum itself, is grounded to lead L3 while the other electrode 13 is connected to lead L4 through a diode D1 and a pair of resistors R1 and R2. The sensing path is thus connected in series with the resistance constituted by resistors R1 and R2 thereby forming a voltage divider which provides a voltage, at the junction between resistors R1 and R2, which varies as a function of the moisture content of the load. One side of a four-layer breakdown diode BD is connected to the junction between the resistors R1 and R2 and its other side is connected to the gate terminal of SCR Q1. The gate is biased toward its off state by a resistor R3. As is understood by those skilled in the art, diode BD will break down and conduct thereby triggering SCR Q1 into conduction when the voltage at the junction between resistors R1 and R2 exceeds a predetermined value corresponding to a preselected dryness level.

The operation of this control is substantially as follows. To initiate a drying cycle, the cams 19 and 21 are rotated, by means of knob 23, in the clockwise direction so that the contacts K1 and K2 are allowed to close. The motor M1 and the heater H1 are thereby energized and will thus begin to dry a load placed in the dryer.

Assuming that the load is relatively damp at the start of the drying cycle, the typical resistance presented across electrodes 11 and 13 will be relatively low. Thus, during those A.C. half cycles when the lead L2 is negative with respect to the neutral lead L3, a relatively high positive voltage will appear between resistors R1 and R2. This relatively high voltage will cause diode BD to break down and to trigger the SCR Q1 into conduction. Conduction through SCR Q1, as explained previously, draws current through PTC thermistor TH thus causing it to be energized at a relatively high level and at the same time shunts motor M2 reducing its energization. The increased energization of thermistor TH causes it to self-heat to a relatively high temperature providing a relatively high level of resistance. Accordingly, the current which can flow from the source (leads L3 and L4) through this thermistor when it is hot is insufficient to energize the motor M2 even if the SCR Q1 does not conduct on any particular half cycle. The timer motor is thus prevented from running while the load is relatively damp.

An advantage of this method of energizing the timer motor M2 through a thermistor is that the high resistance of the thermistor in its hot state reduces the current through the motor's winding to a very low level on both A.C. half cycles. Thus, the unbalanced current or pulsating D.C. which flows through the motor when SCR Q1 is conducting is of a very low level and will not tend to demagnetize the permanent magnet field structures employed in some timer motors. Further, once the thermistor heats up, the current carried by the SCR drops to a relatively low level and thus a relatively small, inexpensive SCR may be used.

As the load dries, the resistance between electrodes 11 and 13 increases in known manner and the typical voltage provided at the junction between resistors R1 and R2 decreases correspondingly. When the load reaches a preselected level of dryness the voltage at this junction falls to a level which causes SCR Q1 to cease conducting. When this happens, the thermistor TH will gradually cool down and will again provide a relatively low level of resistance. The current provided to motor M2 correspondingly increases to a level which is adequate to energize the motor to cause it to run. At this point then, the timer will begin to advance the cams 19 and 21 to provide a terminal period of operation. The cam lobe 31 which operates contacts K2 is preferably longer than the lobe 29 which controls the motor M1 so that the heater H1 is turned off before the dryer motor is deenergized. In this way a cool-down period is provided in which the load is agitated and ventilated without being heated. At the end of the terminal period, the motor M1 is deenergized.

Although the agitation of the load during drying may cause the resistance between electrodes 11 and 13 to jump to a high value on a transient basis so that the SCR Q1 may not be triggered on some A.C. half cycles, the thermal inertia of the thermistor TH prevents it from cooling down appreciably during such intervals. Thus the timer motor M2 will not be transitorily energized or creep due to any such transient variation in the resistance of the sensing path. In other words, the thermistor TH operates as a filter or integrator for signals generated by changes in the resistance of the sensing path.

From the foregoing explanation it can be seen that the control causes the dryer to be operated for a timed interval after a predetermined level of dryness is reached. Since a preselectable timed period is provided after the dryness sensing period, the sensing circuit does not have to discriminate between very high levels of resistance such as are encountered at the end of a drying cycle in which a load is completely dried. Rather, the selection of the particular level of dryness which is to be attained can be performed by varying the duration of the timed portion of the cycle. The dryness sensing circuitry can then be designed by the choice of the values of resistors R1 and R2, to energize the timer motor M2 when a relatively damp level of dryness has been obtained. This level of dryness may, for example, correspond to a resistance between electrodes 11 and 13 on the order of two or three megohms whereas a resistance on the order of 50 to 100 megohms would have to be detected if a completely dry condition were to be sensed by means of the electrodes 11 and 13.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for a dryer having means for agitating a load to be dried and electrode means for contacting the load to establish a current path therethrough, the resistance of said path being variable as a function of the moisture content of the load, said control comprising:

switching means for controlling the energization of said agitating means, said switching means including a timer for providing a terminal period of operation of said dryer at the end of which said agitating means is deenergized, said timer having a motor for advancing said timer;

circuit means for selectively energizing said timer motor, said circuit means including a PTC thermistor connected in series with said motor across a source of electric power; and means for energizing said thermistor at a high level relative to the level of energization of said motor while the resistance of said path is below a preselected threshold thereby to cause said thermistor to self-heat to a relatively high value of resistance, the current which will flow from said source through said high value of resistance being insufficient to operate said motor whereby said timer motor is prevented from running by the high resistance of said thermistor while said load is relatively damp and is permitted to run when said load reaches a preselected level of dryness thereby providing a timed terminal period of operation of said dryer and whereby the thermal inertia of said thermistor prevents transitory energization of said motor in response to transient variations in the resistance of said path before said load reaches said preselected dryness level.

2. A control as set forth in claim 1 wherein said means for energizing said thermistor at a high level relative to the level of energization of said motor includes a semiconductor current switching device which selectively shunts said motor.

3. A control as set forth in claim 2 wherein said semiconductor device is an SCR.

4. A control as set forth in claim 3 including a voltage breakdown diode for triggering said SCR.

5. A control as set forth in claim 1 wherein said electrode means is connected in series with resistance means for providing a voltage which varies as a function of the moisture content of the load.

6. A control as set forth in claim 5 wherein said means for energizing said thermistor at a high level relative to the level of energization of said motor shunts said motor when said voltage exceeds a predetermined level.

7. A control as set forth in claim 1 wherein said dryer includes a drying heater for accelerating drying of said load and wherein said timer comprises respective switches for selectively energizing said drying heater and said agitating means and respective cams driven by said timer motor for operating said switches in predetermined sequence.

8. A control for a dryer having means for agitating a load to be dried and electrode means for contacting the load to establish a current path therethrough, the resistance of said path being variable as a function of the moisture content of the load, said control comprising:

switching means for controlling the energization of said agitating means, said switching means including a timer for providing a terminal period of operation of said dryer at the end of which said agitating means is deenergized, said timer having a motor for advancing said timer;

a PTC thermistor connected in series with said timer motor across a source of electric power;

a triggerable semiconductor current switching device connected across said timer motor;

resistance means connected in series with said electrode means across said source thereby to provide a voltage which varies as a function of the moisture content of the load; and means for triggering said semiconductor device when said voltage exceeds a predetermined level thereby to energize said thermistor at a high level relative to the level of energization of said motor while the resistance of said sensing path is below a preselected threshold and to cause said thermistor to self-heat to a relatively high value of resistance, the current which will flow from said source through said high value of resistance being insufficient to operate said motor, whereby said timer motor is prevented from running by the high resistance of said thermistor while said load is relatively damp and is permitted to run when said load reaches a preselected level of dryness thereby providing a timed terminal period of operation of said dryer and whereby the thermal inertia of said thermistor prevents transitory energization of said motor in response to transient variations in the resistance of said path before said load reaches said preselected dryness level.

References Cited

UNITED STATES PATENTS

| | | | |
|---|---|---|---|
| 3,200,511 | 8/1965 | Smith | 34—55 X |
| 3,331,139 | 7/1967 | Finnegan et al. | 34—45 |
| 3,436,838 | 4/1969 | Helfrich | 34—45 |

CARROLL B. DORITY, Jr., Primary Examiner